United States Patent [19]

Meininger et al.

[11] 4,185,012

[45] Jan. 22, 1980

[54] WATER-SOLUBLE, FIBRE-REACTIVE COPPER COMPLEX DISAZO DYESTUFFS

[75] Inventors: Fritz Meininger; Hartmut Springer, both of Frankfurt am Main, Fed. Rep. of Germany

[73] Assignee: Hoechst Aktiengesellschaft, Frankfurt am Main, Fed. Rep. of Germany

[21] Appl. No.: 718,835

[22] Filed: Aug. 30, 1976

Related U.S. Application Data

[63] Continuation-in-part of Ser. No. 516,093, Oct. 18, 1974, abandoned, which is a continuation-in-part of Ser. No. 182,884, Sep. 22, 1971, abandoned.

[30] Foreign Application Priority Data

Sep. 24, 1970 [DE] Fed. Rep. of Germany ....... 2047025

[51] Int. Cl.$^2$ .................. C09B 45/26; C09B 45/28; C09B 45/30; C09B 45/36
[52] U.S. Cl. .................... 260/148; 260/147; 260/159; 260/184; 260/185; 260/186; 260/187; 260/189; 260/190; 260/191
[58] Field of Search ............ 260/148, 174, 177, 184, 260/185, 187, 189, 190, 191, 186

[56] References Cited

U.S. PATENT DOCUMENTS

| | | | |
|---|---|---|---|
| 3,135,730 | 6/1964 | Heyna et al. | 260/148 X |
| 3,364,194 | 1/1968 | Meininger et al. | 260/148 |
| 3,445,450 | 5/1969 | Meininger et al. | 260/148 |
| 3,457,251 | 7/1969 | Meininger | 260/148 |
| 3,457,252 | 7/1969 | Meininger et al. | 260/148 |
| 3,518,245 | 6/1970 | Meininger et al. | 260/148 X |
| 3,637,645 | 1/1972 | Meininger et al. | 260/148 X |
| 3,655,642 | 4/1972 | Meininger et al. | 260/194 |

FOREIGN PATENT DOCUMENTS

| | | | |
|---|---|---|---|
| 2047025 | 3/1972 | Fed. Rep. of Germany | 260/148 |
| 1106244 | 3/1968 | United Kingdom | 260/148 |
| 1134947 | 11/1968 | United Kingdom | 260/148 |

*Primary Examiner*—Charles F. Warren
*Attorney, Agent, or Firm*—Curtis, Morris & Safford

[57] ABSTRACT

Water copper complex disazo dyestuffs of the formula

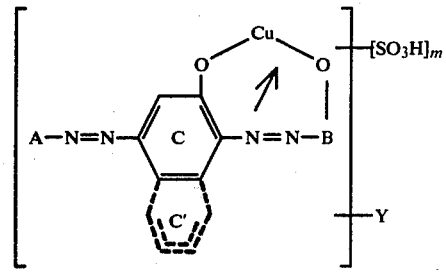

had been found wherein A is phenyl or naphthyl, C is phenylene or phenylene substituted by lower alkyl, C and C' together are naphthylene, B is naphthylene, m is 1, 2, 3, 4, 5 or 6 and Y is —SO$_2$—CH=CH$_2$ or —SO$_2$—CH$_2$—CH$_2$—Z wherein Z is hydroxy, methylsulfonyloxy, p-tolylsulfonyloxy, acetoxy, dimethylamino, diethylamino, thiosulfato, phosphato or sulfato, which are well suitable for dyeing and printing wool, silk and polyamide fibres from an acidic, neutral or slightly alkaline medium, and they are particularly valuable for dyeing and printing cotton and other natural or regenerated cellulose fibres, yielding dyeings and prints distinguished by high tinctorial strengths and intense shades, such as navy blue, grey, black, brown or red brown, having good fastnesses especially to washing, to chlorinated water to light and to dry-cleaning.

6 Claims, No Drawings

WATER-SOLUBLE, FIBRE-REACTIVE COPPER COMPLEX DISAZO DYESTUFFS

This application is a continuation-in-part application of U.S. Patent Application Ser. No. 516,093 filed Oct. 18, 1974, now abandoned, which application was a continuation-in-part application of U.S. Patent Application Ser. No. 182,884 filed Sept. 22, 1971.

The present invention relates to new water-soluble, reactive disazo dyestuffs of the formula (1)

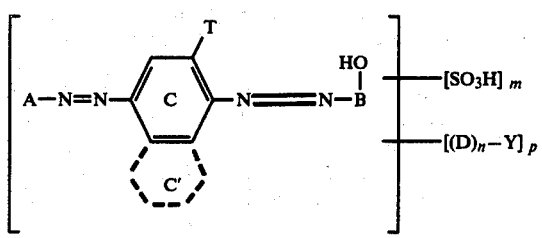

and copper, cobalt or chromium complex disazo dyestuffs thereof which in the metal-free form correspond to the formula (2)

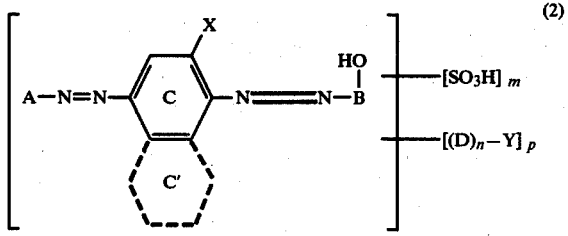

wherein A represents the radical of a diazo component of the benzene or naphthalene series, T is hydrogen or a hydroxyl, carboxyl or low-molecular-weight alkoxy group, X is hydroxyl or carboxyl, B represents the radical of a coupling component of the benzene, naphthalene or pyrazolone series, D is a bivalent bridging member and Y is a group of the formula (3)

or a group of the formula (4)

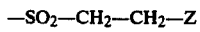

wherein Z is hydroxy or an organic or inorganic radical capable of being split off by an alkaline agent, m is a number of from 1 to 6, n represents the numbers 0 or 1 and p is a number of from 1 to 3, and wherein the nucleus C and/or C' may contain further substituents usual in azo dyestuffs.

The present invention also relates to a process for preparing these dyestuffs, which comprises diazotizing an aminoazo dyestuff of the formula (5)

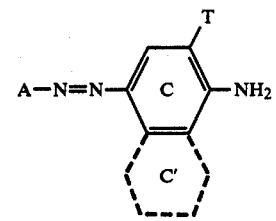

or (6)

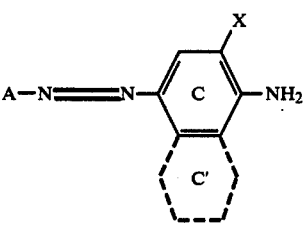

in which A, C, C', T and X have the above meanings, and coupling with an equimolar amount of a coupling component of the formula (7)

wherein B is as defined above; the components are chosen in the way that the resulting disazo dyestuff contains, besides 1 to 6 sulfonic acid groups, 1 to 3 substituents of the formula (3) or (4), if desired bound by the bridging member D. In order to obtain their metal complex compounds, the disazo dyestuffs thus prepared may be reacted with copper-yielding agents, optionally under the conditions of the oxydative or disalkylating coppering, or with a cobalt-or chromium-yielding agent. In the case of the metal-free or metal-containing disazo dyestuffs thus obtained, the hydroxyl group of the group —SO$_2$—CH$_2$—CH$_2$—OH may be esterified, if desired, subsequently with sulfuric acid or with a compound yielding sulfur trioxide.

As organic or inorganic radicals Z capable of being split off by an alkaline agent, there may be mentioned the following compounds: the ester group of the alkyl or arylsulfonic acids such as the methylsulfonyloxy or the p-toluene-sulfonyloxy group; acyloxy groups such as the acetoxy group or the 3-sulfobenzoyl-oxy group; dialkylamino groups such as the dimethyl or the diethylamino group; furthermore the ester group of the thiosulfuric acid or of the phosphoric acid and especially of the sulfuric acid.

As bivalent bridging member there may be mentioned for example the following groups:

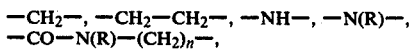

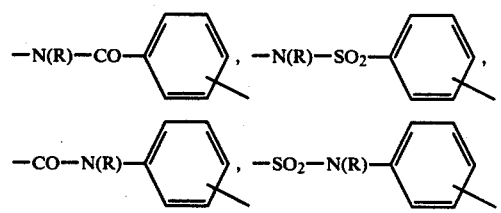

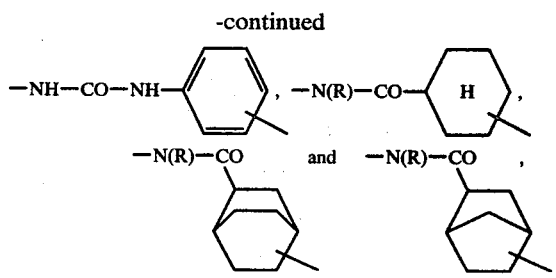

wherein R stands for a low-molecular-weight alkyl radical or preferably for hydrogen, and wherein n stands for an integer of from 1 to 6.

The diazo and coupling components being the basis of the radical A and the radical B in formulae in (1) and (2) may contain further substituents usual in azo dyestuffs, such as halogen atoms, lower alkyl, lower alkoxy, carboxylic acid, nitro and acylamino groups.

The substituents which may be contained in the nucleus C or C' are preferably halogen atoms such as flourine or chlorine atoms, alkyl radicals such as methyl, ethyl or propyl groups as well as lower alkoxy groups such as methoxy or ethoxy groups. Suitable metal-yielding agents are for example the water-soluble copper, cobalt and chromium salts, as for example sulfates, chlorides, acetates, formiates and the salts of organic sulfonic acids.

For converting the above-obtained o,o'-dihydroxydisazodyestuffs of the formula (1) into their metal complex compounds, the copper, cobalt and chromium compounds are advantageously reacted in a slightly acidic aqueous solution or in an organic medium for example in formamide. In the case of the disazo dyestuffs of the formula (1) which contain an o-hydroxy-o'-alkoxy-azo group, the metallization is effected under conditions which convert the alkoxy group bound in an o-position with regard to the azo group, into a hydroxyl group, for example by heating for rather a long time in the presence of copper salts and aqueous ammonia in excess.

For avoiding undesired secondary reactions of the groups of the formulae (3) or (4) contained in the starting dyestuffs of the formula (1), it is generally necessary to find out in each case the best metallization process.

The disazo or metal-complex disazo dyestuffs is effected by salting out, for example with sodium or potassium chloride or by spray drying the preparation mixture.

Preferably, the dyestuffs are water-soluble copper complex disazo dyestuffs of the formula

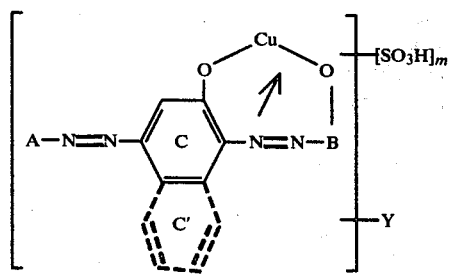

wherein A is phenyl or naphthyl, C is phenylene or phenylene substituted by lower alkyl, C and C' together are naphthylene, B is naphthylene, m is 1, 2, 3, 4, 5 or 6 and Y is $-SO_2-CH=CH_2$ or $-SO_2-CH_2-CH_2-Z$ wherein Z is hydroxy, methylsulfonyloxy, p-tolylsulfonyloxy, acetoxy, dimethylamino, diethylamino, thiosulfato, phosphato or sulfato. Also desirable are those compounds wherein Y is a group of the formula $$-SO_2-CH_2-CH_2-O-SO_3H$$

which is bound to A or B or C'.

The dyestuffs according to the invention may be used for dyeing textile materials. They are distinguished by a high tinctorial strength and are suitable, for example, for dyeing wool, silk and polyamide fibres; they are employed from an acidic, neutral or slightly alkaline dyebath. They are particularly valuable as "reactive dyestuffs" for dyeing cotton and other natural or regenerated cellulose fibres. For dyeing these materials, the dyestuffs are used according to printing and dyeing processes in relation with a treatment with an acid-binding agent such as sodium hydroxide, sodium carbonate or sodium bicarbonate. According to this process above all cellulose textile materials may be dyed in intense shades: navy blue, grey or black, brown, red brown or in similar shades which exhibit a much better fastness to washing than dyeings of a comparable shade and prepared by the use of direct dyestuffs. The dyeings and prints obtained with the use of the novel dyestuffs of this invention show an equal and level shade and a good colour-build-up. They have good to very good fastnesses to light in the dry and wet state, to alkali, to acid, to water, to washing, also to washing in the presence of sodium perborate or sodium hypochlorite, to alkaline and acid perspiration, to fulling and cross-dyeing, to steaming, ironing and rubbing, to chlorinated bathwater, to mercerizing, to vulcanizing, to discharge, for example to sodium dithionite, and to the action of solvents.

The following Examples illustrate the invention. Parts and percentages are by weight, unless stated otherwise. The relationship between "parts by weight" and "parts by volume" is "grams" and "cubic centimeters".

EXAMPLE 1

21.1 Parts of 1-amino-benzene-4-β-hydroxyethylsulfone were introduced into a mixture of 200 parts by volume of water and 25 parts by volume of concentrated hydrochloric acid and diazotized at 0°-5° C. with 21 parts by volume of a 5 N sodium nitrite solution. The resulting solution was mixed with a solution of 13.2 parts of 3-amino-4-methoxy-toluene, 60 parts by volume of diluted hydrochloric acid and 400 parts by volume of water. pH was adjusted to 4.5 with sodium carbonate, and the whole was coupled at 5°-10° C. The amino azo dyestuff obtained was filtered and washed with diluted sodium chloride solution.

The amino azo dyestuff was diazotized in usual manner and mixed with a neutralized solution of 63.3 parts of 1-hydroxynaphthalene-3,6-disulfonic acid (48%) in 200 parts by volume of water. Coupling was effected at pH 8 and 10°-15° C., and the resulting disazo dyestuff was isolated by salting out with potassium chloride. The dyestuff was filtered and washed with potassium chloride solution.

The moist filter cake was introduced into a mixture of 920 parts by volume of water, 50 parts of diethanol amine, 39 parts of crystallized copper sulfate and 50 parts of aqueous ammonia. Then the mixture was stirred at 90° C., until the formation of the copper complex was finished. The product was salted out with potassium chloride, filtered, washed and dried in vacuo at 80° C. A dark dyestuff powder containing salt was obtained, which dissolved in water with a blue color.

The dyestuff corresponds in form of the free acid to the formula

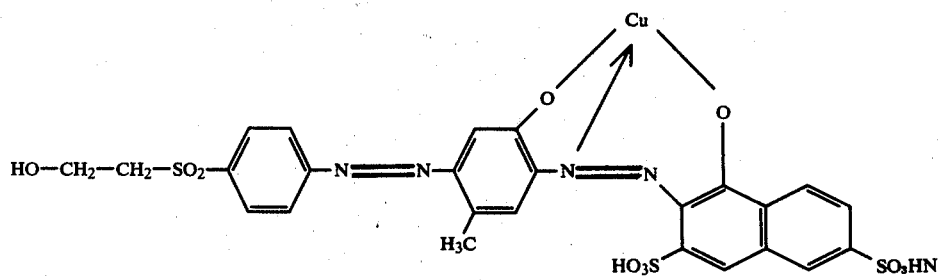

and yielded on cotton in the presence of sodium hydroxide, a blue dyeing which was fixed by heat treatment to become fast to washing.

EXAMPLE 2

The copper complex disazo dyestuff prepared according to Example 1 was introduced at 10°-20° C. into 680 parts of concentrated sulfuric acid. The mixture was stirred for 12 hours at 20° C. and added to crushed ice. With sodium hydroxide solution, pH was adjusted to 6.5 and after adding 30 parts of crystallized sodium acetate, the whole was stirred for 1 hour at 50° C. The copper complex disazo dyestuff obtained, which in form of the free acid corresponds to the formula

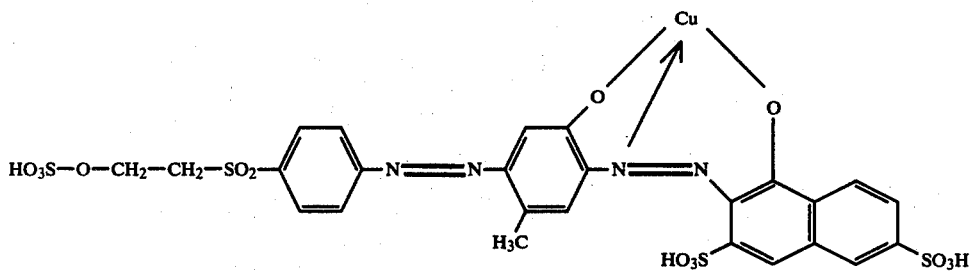

was precipitated with potassium chloride, filtered and washed.

After drying a dark powder was obtained which dissolved in water with a blue color and yielded on cotton in the presence of sodium hydroxide intense blue dyeings very fast to washing and to light.

EXAMPLE 3

35.2 Parts of the amino monoazo dyestuff of the formula

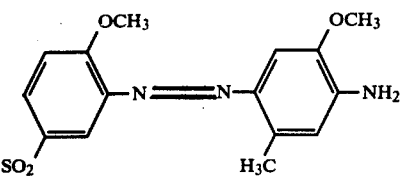

were diazotized in known manner and mixed with a neutralized solution of 63.3 parts of 1-hydroxy-naphthalene-3,6-disulfonic acid in 200 parts by volume of water. Coupling was effected at pH 7 and 10°-15° C., and the resulting disazo dyestuff was isolated by salting out with sodium chloride. The dyestuff was filtered and washed with diluted sodium chloride solution.

The moist filter cake was introduced into a mixture consisting of 1350 parts by volume of water, 110 parts of diethanol amine, 35 parts of crystallized copper sulfate and 50 parts of aqueous ammonia. Then the mixture was stirred at 90°-95° C. until the formation of the copper complex was finished, and filtered. The copper complex disazo dyestuff obtained was salted out from the filtrate with 25% of potassium chloride (calculated on the volume of the dyestuff solution), filtered, washed with a 25% potassium chloride solution and dried.

A dark salt-containing powder was obtained which dissolved in water with a blue color. The dyestuff corresponds in form of the free acid to the formula

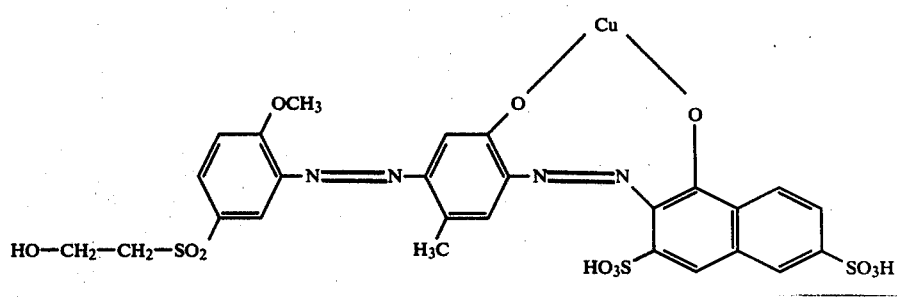

and yielded on cotton in the presence of sodium hydroxide and under the action of heat blue prints being very fast to light and to washing.

dyestuff corresponds in form of the free acid to the formula

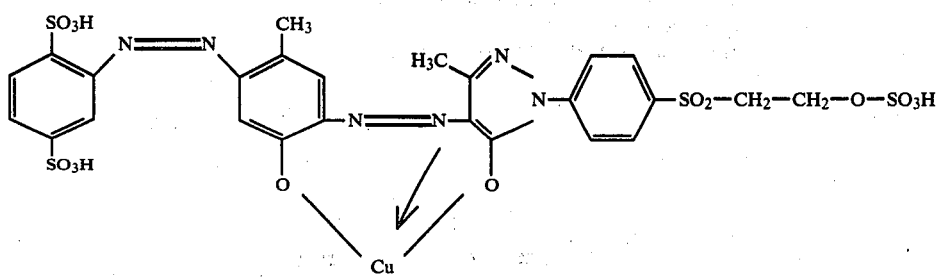

EXAMPLE 4

40.1 Parts of 4-amino-2-methyl-5-methoxy-azobenzene2',5'-disulfonic acid were dissolved until neutral in 450 parts by volume of water and mixed with 21 parts by volume of 5 N sodium nitrite solution. The solution obtained was poured slowly into a mixture of 200 parts of concentrated hydrochloric acid. The suspension of the diazonium salt was adjusted to pH 6 with sodium carbonate and then mixed with a solution of 34.9 parts of 1-(phenyl-4'-β-hydroxy-ethylsulfone)-3-methyl-5-pyrazolone (81%) in 400 parts by volume of water and 50 parts by volume of 2 N sodium hydroxide solution at 5°–10° C.

Coupling was effected at pH 7.5–8 by adding sodium carbonate, and the resulting disazo dyestuff was isolated by salting out with potassium chloride. The orange red precipitation product was filtered and introduced while stirring into a mixture consisting of 1200 parts by volume of water, 75 parts of diethanol amine, 30 parts by volume of concentrated ammonia and 25 parts of crystallized copper sulfate. The mixture was stirred for 13 hours at 90°–95° C., cooled to room temperature and mixed with 25% of potassium chloride (calculated on the volume of the solution). The precipitated copper complex disazo dyestuff was filtered, washed with diluted potassium chloride solution and dried.

The resulting dark powder was slowly introduced into 500 parts of concentrated hydrochloric acid at 10°–20° C. The esterification mixture was stirred for still 10 hours and added to a mixture of ice and water. After neutralizing with sodium hyroxide solution, stirring was continued for 1 hour at 40°–50° C., then cooled and the esterified dyestuff was salted out with potassium chloride. It was filtered, washed with diluted potassium chloride solution and dried.

A dark violet brown powder was obtained which dissolved in water with a red brown color. The new dyestuff corresponds in form of the free acid to the formula and yielded in the presence of acid-binding agents brown dyeings on cotton very fast to washing and to light.

EXAMPLE 5

17.3 Parts of 1-aminobenzene-4-sulfonic acid were diazotized in a mixture of 150 parts of ice-water and 50 parts of concentrated hydrochloric acid with 17.5 parts of sodium nitrite solution (40%). A solution of 33.1 parts of 2-aminonaphthyl-6-β-hydroxyethylsulfone-sulfuric acid ester and 6.5 parts of sodium carbonate in 250 parts of water were added to the diazonium salt obtained. Coupling was effected at pH 4–5, and the resulting amino monoazo dyestuff was diazotized with 17.5 parts of sodium nitrite solution (40%). Subsequently 30.4 parts of the 2-hydroxy-naphthalene-3,6-disulfonic acid were added, and pH was adjusted to 5.0 by addition of sodium carbonate. When the coupling was completed, the disazo dyestuff was salted out with potassium chloride and isolated by filtration. The filter cake was dissolved in 1000 parts of water and mixed with a solution of 25 parts of crystallized copper sulfate in 100 parts by volume of water. At pH 4.8–5.0, 60 by volume of hydrogen peroxide (10%) were introduced within half an hour. When the formation of the copper complex disazo dyestuff was finished, the product was salted out with potassium chloride, filtered and dried at 60° C. 96 Parts of a salt-containing powder was obtained which dissolved in water with a blue color. The dyestuff thus prepared corresponds in form of the free acid to the formula

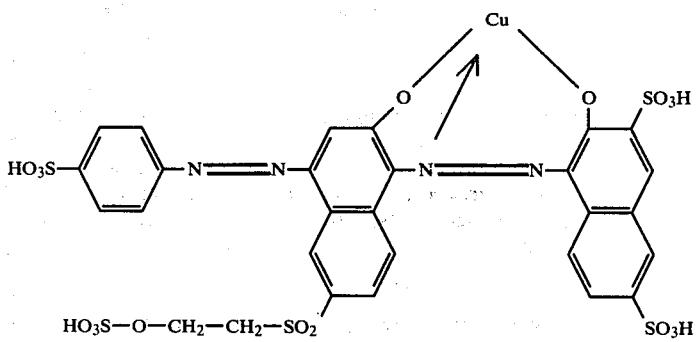

and provided in the presence of sodium carbonate blue dyeings on cotton which exhibit a good fastness to washing and a very good fastness to light.

EXAMPLE 6

17.3 Parts of 1-amino-benzene-4-sulfonic acid were diazotized according to Example 5 and coupled with 33.1 parts of 1-amino-naphthyl-6-β-hydroxyethylsulfone-sulfuric acid ester. The resulting amino-monoazo dyestuff was further diazotized and mixed with 30.4 parts of 1-hydroxy-naphthalene-4.8-disulfonic acid. Coupling was effected by adding sodium carbonate at pH 5.0 and the violet disazo dyestuff was isolated by salting out with potassium chloride and filtration. The filter cake was dissolved in 1000 parts by volume of water and dissolved while heating. 25 Parts of crystallized copper sulfate, dissolved in 100 parts by volume of water, were added and at 40°–45° C., 50 parts by volume of hydrogen peroxide (10%) were introduced within half an hour. By adding sodium acetate, the reaction was effected at pH 4.8–5.0. When the coupling was completed, the resulting copper complex disazo dyestuff of the formula 250 parts by volume of water and, after addition of 17.5 parts of a 40% sodium nitrite solution, converted into a mixture of 30 parts of a 37% hydrochloric acid and 150 parts of ice. A neutralized solution of 33.1 parts of 1-amino-naphthyl-6-β-hydroxyethylsulfone-sulfuric acid ester in 250 parts by volume of water was added to the suspension of the diazonium salt, and the mixture was stirred for still 3 hours while being cooled with ice. The amino monoazo dyestuff obtained was salted out with sodium chloride, filtered and washed. The filter cake was dissolved in 750 parts by volume of water at 45° C. and, after addition of 17.5 parts of a 17.5% sodium nitrite solution, introduced while stirring into a mixture of 30 parts of a 37% hydrochloric acid and 250 parts of ice. When diazotizing was finished, 30.4 parts of 2-naphthol-3,6-disulfonic acid were added and pH was adjusted to 5 with sodium carbonate. When the coupling was completed, the violet disazo dyestuff of the formula

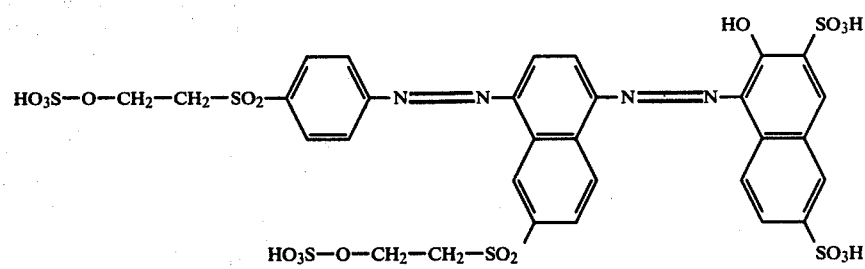

was salted out with potassium chloride, filtered and

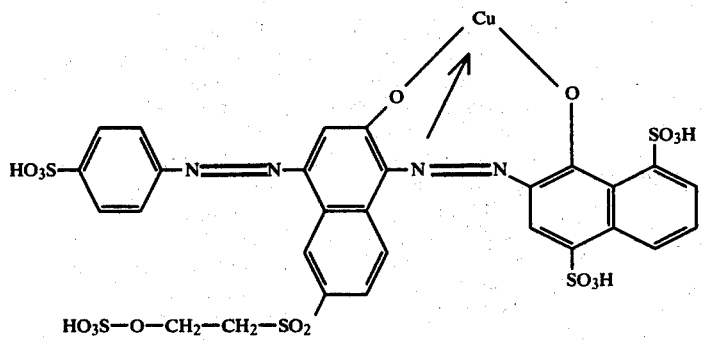

was salted out with potassium chloride, filtered and dried. 86 Parts of a salt-containing dark powder were obtained which dissolved in water with a blue color and yielded on cotton in the presence of sodium carbonate greenish blue printing samples very fast to washing and to light.

EXAMPLE 7

28.1 Parts of 1-aminobenzene-4-β-hydroxyethylsulphone-sulfuric acid ester were dissolved until neutral in washed. The product was dissolved in 1200 parts by volume of water heated to 50° C. and mixed with a solution of 27.5 parts of crystallized copper sulfate in 150 parts by volume of water and 66 parts by volume of a 10% hydrogen peroxide within 1 hour; the pH was maintained at 4.8–5.1 by adding sodium acetate. When the reaction was completed, the resulting copper complex disazo dyestuff of the formula

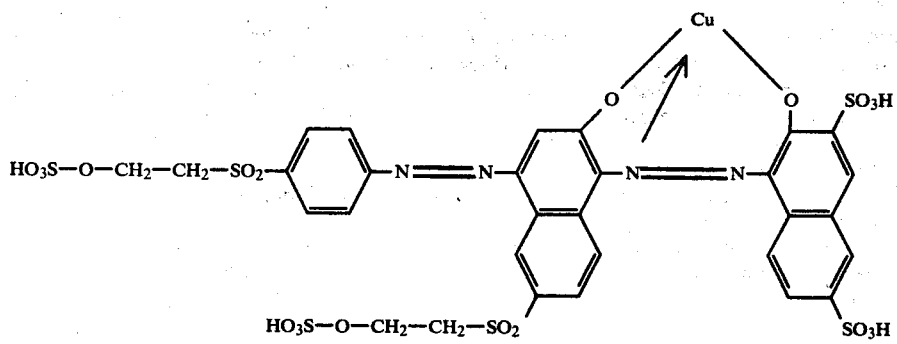

was salted out with 10% of potassium chloride (calculated on the volume of the dyestuff solution), filtered and dried. A dark powder was obtained which dissolved in water with a blue color and yielded from a sodium carbonate alkaline dyebath opaque reddish blue shades on cotton fabrics. The dyeings are very fast to dry cleaning, washing and to light.

EXAMPLE 8 ume of water. Coupling was effected at pH 6.5 and the resulting disazo dyestuff was isolated by salting out with potassium chloride. For converting into the corresponding 1:2 chromium complex compound, the moist filter cake was dissolved in 750 parts by volume of water at pH 6.5–7, and the resulting solution was mixed with 25 parts of chromium alum and 32 parts of crystallized sodium acetate and then refluxed. The chromium complex disazo dyestuff of the formula

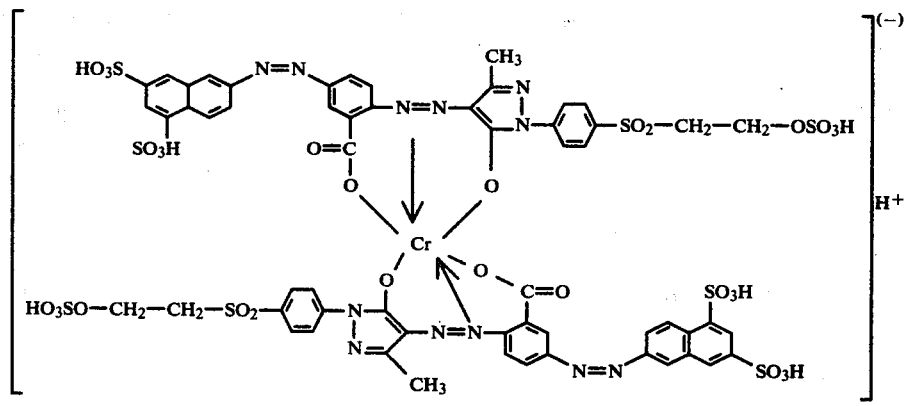

67.5 Parts of 2-amino-naphthalene-5,7-disulfonic acid (51.4%) were dissolved until neutral in 200 parts by volume of water and diazotized in usual manner. When diazotizing was finished, a solution of 16.7 parts of anthranilic acid (82%) were introduced at 2°–7° C. into 200 parts by volume of water, and pH was adjusted to 3 with sodium acetate. The amino monoazo dyestuff obtained was salted out with 25% of potassium chloride (calculated on the volume of the dyestuff solution), filtered and washed with diluted potassium chloride solution. The filter cake was dissolved until neutral with 21 parts by volume of 5 N sodium nitrite solution and added at 0°–5° C. to a mixture of 25 parts by volume of concentrated hydrochloric acid and 200 parts of ice. When diazotizing was finished, pH was adjusted to 5 with sodium carbonate, and the mixture was added to a neutral solution of 30 parts of 1-(4'-β-sulfato-ethylsulfonyl-phenyl)-3-methyl-5-pyrazolone in 250 parts by volume of water. Coupling was effected at pH 6.5 and the was salted out with sodium chloride at 20° C., filtered and dried. A brown powder was obtained, which dissolved in water with a yellow brown color and yielded on cotton in the presence of sodium carbonate intense brown prints of an excellent fastness to washing.

The dyestuffs listed in the following Table may be prepared in analogy to the dyestuffs described in the preceding Examples. They yield on cellulose fibre materials dyeings and prints having the above-mentioned good fastness properties. The Roman numbers indicated in the Table mean that as middle component either 3-methylaniline (I), 2-methoxy-5-methylaniline (II), 2,5-dimethoxy-aniline (III), 2-methoxy-aniline (IV), 2-methoxy-1-amino-naphthalene-7-sulfonic acid (V), 2-methoxy-1-amino-naphthalene-6-sulfonic acid (VI) or 1-aminonaphthalene-6-β-hydroxyethylsulfone-sulfuric acid ester (VII) was used.

| Amino-monoazo dyestuff | Coupling component | Metal | Shade |
| --- | --- | --- | --- |
| 2-amino-1-methoxy-benzene-4-β-hydroxy-ethylsulfone-sulfuric acid ester (II) | 1-hydroxy-naphthalene-3,6-disulfonic acid | Cu | navy blue |
| 2-amino-1-methoxy-benzene-3-β-hydroxy-ethylsulfone-sulfuric acid ester (II) | 1-amino-8-hydroxy-naphthalene-2,4-disulfonic acid | Cu | bluish green |

-continued

| Amino-monoazo dyestuff | Coupling component | Metal | Shade |
| --- | --- | --- | --- |
| 2-amino-1-methoxy-benzene-4-β-hydroxy-ethylsulfone-sulfuric acid ester (II) | 2-acetylamino-8-hydroxynaphthalene-3,6-disulfonic acid | Cu | greenish blue |
| 2-amino-1-methoxy-benzene-4-β-hydroxy-ethylsulfone-sulfuric acid ester (II) | 1-amino-8-hydroxy-naphthalene | Cu | " |
| 2-amino-1-methoxy-benezene-4-β-hydroxy-ethylsulfone-sulfuric acid ester (II) | 1-benzoylamino-8-hydroxy-naphthalene-4,6-disulfonic acid | Cu | " |
| 1-amino-benzene-4-β-hydroxyethyl-sulfone-sulfuric acid ester (II) | 1-amino-8-hydroxy-naphthalene-4,6-disulfonic acid | Cu | bluish green |
| 2-amino-1-methoxy-benzene-4-β-hydroxy-ethylsulfone-sulfuric acid ester (VI) | 1-amino-8-hydroxy-naphthalene-2,4-disulfonic acid | Cu | green |
| 1-amino-benzene-4-β-hydroxyethyl-sulfone-sulfuric acid ester (II) | 1-amino-8-hydroxy-naphthalene-3,6-disulfonic acid | — | black |
| 1-amino-benzene-4-β-hydroxyethyl-sulfone-sulfuric acid ester (I) | 2-hydroxy-naphthalene-6,8-disulfonic acid | — | bordo |
| 1-amino-benzene-2,5-disulphonic acid (II) | 1-(4'-β-sulfato-ethylsulfonyl phenyl)-3-methyl-5-pyrazolone | — | reddish orange |
| 1-amino-benzene-4-β-hydroxyethyl-sulfone-sulfuric acid ester (II) | 2-hydroxy-naphthalene-3,6-disulfonic acid | Cu | bluish violet |
| 1-amino-benzene-4-β-hydroxyethyl-sulfone-phosphoric acid ester (II) | 1-amino-8-hydroxy-naphthalene-3,6-disulfonic acid | Cu | bluish green |
| 1-amino-benzene-4-β-hydroxyethyl-sulfone-sulfuric acid ester → 2-amino-benzoic acid | 1-acetylamino-8-hydroxynaphthalene-3,6-disulfonic acid | Cu | navy blue |
| 1-amino-benzene-4-β-hydroxyethyl-sulfone-sulfuric acid ester → 2-amino-benzoic acid | 1-acetylamino-8-hydroxynaphthalene-3,6-disulfonic acid | Cr | blue grey |
| 1-amino-benzene-3-β-hydroxyethyl-sulfone-sulfuric acid ester (VI) | 1-acetylamino-8-hydroxynaphthalene-3,6-disulfonic acid | — | blue |
| 2-amino-naphthalene-4,8-di-(β-hydroxy-ethylsulfone-sulfuric acid ester) (III) | 1-hydroxynaphthalene-3,6-disulfonic acid | — | navy blue |
| 2-amino-naphthalene-4,8-di-(β-hydroxy-ethylsulfone-sulfuric acid ester) (III) | 1-hydroxynaphthalene-3,6-disulfonic acid | Cu | blue green |
| 1-aminobenzene-3-β-hydroxyethyl-sulfone sulfuric acid ester (V) | 1-acetylamino-8-hydroxynaphthalene-3,6-disulfonic acid | — | blue |
| 2-amino-naphthalene-8-(β-hydroxy-ethyl-sulfone-sulfuric acid ester)-8-sulfonic acid (II) | 1-naphthol-3,6-disulfonic acid | — | violet |
| 2-amino-naphthalene-8-(β-hydroxy-ethyl-sulfone-sulfuric acid ester)-6-sulfonic acid (II) | 1-naphthol-3,6-disulfonic acid | Cu | blue |
| 2-amino-naphthalene-8-(β-hydroxy-ethylsulfone-sulfuric acid ester)-6-sulfonic acid (II) | 1-amino-8-hydroxynaphthalene-2,4-disulfonic acid | Cu | dark green |
| 2-amino-napthalene-8-(β-hydroxy-ethylsulfone-sulfuric acid ester)-6-sulfonic acid → 2-amino-benzoic acid | 1-naphthol-3,6-disulfonic acid | Co | brown |
| 2-amino-naphthalene-8-(β-hydroxy-ethylsulfone-sulfuric acid ester)-6-sulfonic acid → 2-amino-benzoic acid | 1-naphthol-3,6-disulfonic acid | Cr | black |
| 1-amino-benzene-4-β-hydroxyethyl-sulfone-sulfuric acid ester → 1-amino-naphthalene-6-sulfonic acid | 1-acetylamino-8-hydroxynaphthalene-3,6-disulfonic acid | — | blue |
| 1-amino-benzene-4-β-hydroxyethyl-sulfone-sulfuric acid ester → 1-amino-naphthalene-6-sulfonic acid | 1-(4'-sulfophenyl)-3-methyl-5-pyrazolone | — | orange brown |
| 1-amino-benzene-4-β-hydroxethyl-sulfone-sulfuric acid ester → 1-amino-naphthalene-6-sulfonic acid | 1-(4'-sulfophenyl)-3-carboxy-5-pyrazolone | — | red |
| 1-amino-benzene-4-β-hydroxyethyl-sulfone-sulfuric acid ester → 1-amino-naphthalene-6-sulfonic acid | 1-(4',8'-disulfo-2'-naphthyl)-3-methyl-5-pyrazolone | — | orange brown |
| 1-amino-benzene-4-β-hydroxyethyl-sulfone-sulfuric acid ester → 1-amino-naphthalene-6-sulfonic acid | 1,3-dihydroxy-benzene | — | red brown |
| 1-amino-benzene-4-β-hydroxyethyl-sulfone-sulfuric acid ester → 1-amino-naphthalene-(6+7)-sulfonic acid | 1-(4',8'-disulfo-)2'naphthyl-3-methyl-5-pyrazolone | — | reddish orange |
| 1-naphthylamine-4-sulfonic acid-6-β-hydroxy-ethylsulfone-sulfuric acid ester (II) | 1-naphthol-4,8-disulfonic acid | Cu | bluish grey |
| 2-amino-1-methoxy-benzene-4-β- | 1-hydroxy-naphthalene-3,6-di- | Cu | navy blue |

| Amino-monoazo dyestuff | | Coupling component | Metal | Shade |
|---|---|---|---|---|
| hydroxyethyl-sulfone-sulfuric acid ester | (IV) | sulfonic acid | | |
| 2-amino-1-methoxy-benzene-4-β-di-amino-ethylsulfone | (II) | 1-hydroxy-naphthalene-3,6-disulfonic acid | Cu | navy blue |
| 1-amino-benzene-4-β-thiosulfato-ethyl-sulfone | (II) | 1-amino-8-hydroxy-naphthalene-4,6-disulfonic acid | Cu | bluish green |
| 1-amino-benzene-3-β-acetoxy-ethyl-sulfone | (VI) | 1-acetylamino-8-hydroxy-naphthalene-3,6-disulfonic acid | — | blue |
| 2-amino-1-methoxy-benzene-4-vinyl sulfone | (II) | 1-hydroxy-naphthalene-3,6-disulfonic acid | Cu | navy blue |
| 1-amino-2-methoxy-5-(N-ethyl-ethionyl-amino)-benzene | (VI) | 1-acetylamino-8-hydroxy-naphthalene-3,6-disulfonic acid | — | blue |
| 1-amino-2-methoxy-5-ethionylamino-benzene | (VI) | 1-acetylamino-8-hydroxynaphthalene-3,6-disulfonic acid | — | blue |
| 1-amino-3-(N-methyl-ethionylamino)-benzene | (VI) | 1-acetylamino-8-hydroxynaphthalene-3,6-disulfonic acid | — | blue |
| 1-amino-benzene-3-β-phenoxyethyl-sulfone | (VI) | 1-acetylamino-8-hydroxynaphthalene-3,6-disulfonic acid | — | blue |
| 1-amino-benzene-3-β-hydroxyethyl-sulphone-methylsulfonic acid ester | (II) | 1-acetylamino-8-hydroxynaphthalene-3,6-disulfonic acid | — | blue |
| 3-aminobenzyl-β-hydroxyethylsul-fone-sulfuric acid ester | (II) | 1-hydroxy-naphthalene-3,6-disulfonic acid | Cu | reddish blue |
| 3-amino-4-carboxy-benzene-1-β-hydroxy-ethylsulfone-sulfuric acid ester | (II) | 1-hydroxynaphthalene-3,6-disulfonic acid | Cu | blue |
| 5-amino-2-methyl-m-xylylyl-α¹α²-bis-(sulfonylethanol)-sulfuric acid ester | (II) | 1-hydroxy-naphthalene-3,6-disulfonic acid | Cu | reddish blue |
| 1-amino-benzene-4-β-hydroxyethyl-sulfone-sulfuric acid ester → 2-amino-benzoic acid | | 1-[β-chloro-ethylsulfonyl-cyclohexyl-carbonamido]-8-hydroxy-naphthalene-3,6-disulfonic acid | Cu | blue |
| 1-aminobenzene-3-sulfonic acid → 2-amino-benzoic acid | | 1-[β-chloro-ethylsulfonyl-endo-ethylene-cyclohexyl-carbonamido]-8-hydroxy-naphthalene-3,6-disulfonic acid | Cu | Blue |
| 4-amino-benzoic acid N'-γ-(β-hydroxy-ethylsulfonyl)-propylamid, sulfuric acid ester → 2-amino-benzoic acid | | 1-acetylamino-8-hydroxy-naphthalene-3,6-disulfonic acid | Cu | blue |
| 1-amino-benzene-2,5-disulfonic acid | (II) | 1-[3'-β-chloroethyl-sulfonylbenzene-sulfonyl-amino]-8-hydroxy-naphthalene-4,6-disulfonic acid | Cu | blue |
| 2-amino-naphthalene-8-(β-hydroxyethyl-sulfone)-6-sulfonic acid → 2-aminophenol | | 1-(2',5'-disulfo-phenyl)-3-methyl-5-pyrazolone | Cu | brown |
| 2-amino-naphthalene-4,8-di-(β-hydroxy-ethyl-sulfone-sulfuric acid ester) | (VII) | 1-naphthol-4,8-disulfonic acid | Cu | greenish blue |
| 2-amino-naphthalene-4,6,8-trisulfonic acid | (VI) | 1-vinylsulfonylamino-8-hydroxy-naphthalene-3,6-disulfonic acid | Cu | blue |
| 1-amino-benzene-2,5-disulfonic acid | (II) | N-[8-hydroxy-3,6-disulfo-naphthyl(1)]-N'-[3'-(β-chloroethyl-sulfonyl-phenyl)]urea | Cu | blue |

We claim:
1. A water-soluble copper complex disazo dyestuff of the formula

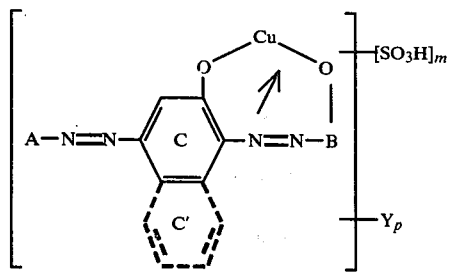

wherein A is phenyl, phenyl substituted by methoxy or carboxy or naphthyl, C is phenylene, phenylene substituted by methoxy or phenylene substituted by lower alkyl, C and C' together are naphthylene, B is naphthylene or naphthalene substituted by amino, acetylamino or benzoylamino, m is 1, 2, 3, 4, 5 or 6, Y is —SO$_2$—CH=CH$_2$, —NH—SO$_2$CH=CH$_2$ or —SO$_2$—CH$_2$—Z wherein Z is hydroxy, methylsulfonyloxy, p-tolylsulfonyloxy, acetoxy, dimethylamino, diethylamino, thiosulfato, phosphato or sulfato and P is 1 or 2, or 1 or 2 or 3 where Y is β-hydroxy-ethyl-sulfone sulfuric acid ester.

2. A water-soluble copper complex disazo dyestuff of the formula

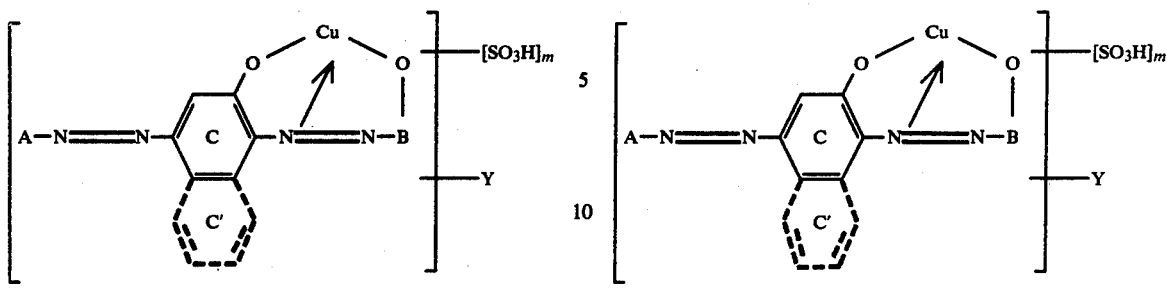

wherein A is phenyl or naphthyl, C is phenylene or phenylene substituted by lower alkyl, C and C' together are naphthylene, B is naphthylene, m is 1, 2 or 3 and Y, being substituted in A or C' only, is —SO₂—CH—CH₂ or —SO₂—CH₂—CH₂—Z wherein Z is hydroxy, methylsulfonxyloxy, p-tolysulfonyloxy, acetoxy, dimethylamino, diethylamino, thiosulfato, phosphato or sulfato.

3. A water-soluble copper complex disazo dyestuff according to claim 1 of the formula wherein A, B, C, C' and m have the meanings given in claim 2 and Y is the group of the formula

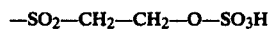

bound to A or C'.

4. The copper complex disazo dyestuff of the formula

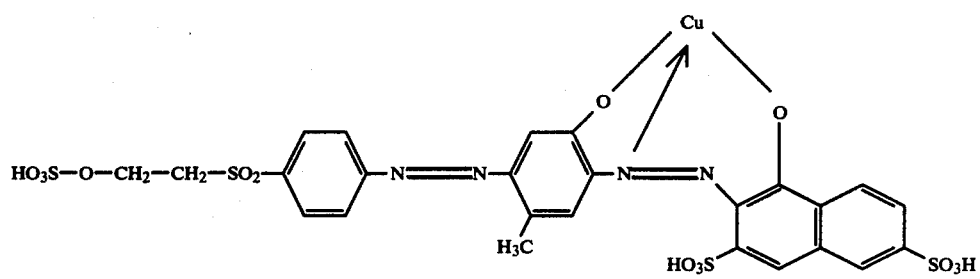

5. The copper complex disazo dyestuff of the formula

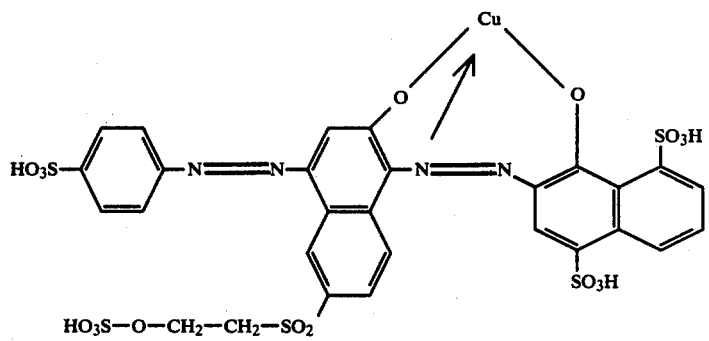

6. The copper complex disazo dyestuff of the formula

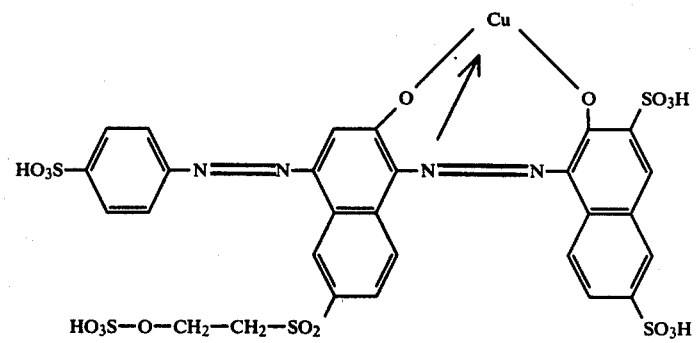

* * * * *